US007412509B2

(12) United States Patent
Murase et al.

(10) Patent No.: US 7,412,509 B2
(45) Date of Patent: Aug. 12, 2008

(54) CONTROL SYSTEM COMPUTER, METHOD, AND PROGRAM FOR MONITORING THE OPERATIONAL STATE OF A SYSTEM

(75) Inventors: Atsushi Murase, Sagamihara (JP); Toshiaki Hirata, Kashiwa (JP)

(73) Assignee: Hitachi, Ltd., Tokyo (JP)

( * ) Notice: Subject to any disclaimer, the term of this patent is extended or adjusted under 35 U.S.C. 154(b) by 1003 days.

(21) Appl. No.: 10/718,708

(22) Filed: Nov. 24, 2003

(65) Prior Publication Data
US 2004/0127999 A1 Jul. 1, 2004

(30) Foreign Application Priority Data
Dec. 26, 2002 (JP) .............................. 2002-375852

(51) Int. Cl.
*G06F 15/173* (2006.01)
*G06F 11/00* (2006.01)
*G06F 11/30* (2006.01)
*G21C 17/00* (2006.01)
(52) U.S. Cl. .......................... 709/224; 714/39; 702/182
(58) Field of Classification Search ........................ None
See application file for complete search history.

(56) References Cited
U.S. PATENT DOCUMENTS
6,086,618 A * 7/2000 Al-Hilali et al. ............... 703/2
6,467,052 B1 * 10/2002 Kaler et al. ................. 714/39
6,742,143 B2 * 5/2004 Kaler et al. ................. 714/39
6,912,534 B2 * 6/2005 DeBettencourt et al. ...... 707/10
7,107,339 B1 * 9/2006 Wolters ...................... 709/224
2002/0099818 A1 * 7/2002 Russell et al. ............... 709/224

FOREIGN PATENT DOCUMENTS
| JP | 02085722 | 3/1990 |
| JP | 06168342 | 6/1994 |
| JP | 08065302 | 3/1996 |
| JP | 11234274 | 8/1999 |
| JP | 2002071349 | 3/2002 |
| JP | 2002268922 | 9/2002 |

* cited by examiner

*Primary Examiner*—John B. Walsh
(74) *Attorney, Agent, or Firm*—Mattingly, Stanger, Malur & Brundidge, P.C.

(57) ABSTRACT

A control system, computer, method and computer program that imposes a monitoring load to the extent necessary to carry out pattern analysis on the operation of a system and failure analysis and does not apply any excessive monitoring load. The invention includes an interface for receiving an operation performance metric value of each of a plurality of first monitored items from a monitored computer, and a control section for, based on the operation performance metric value of each first monitored item, determining a second monitored item whose data should be obtained and instructing the monitored computer to obtain an operation performance metric value of the second monitored item which is associated with each first monitored item.

28 Claims, 7 Drawing Sheets

FIG.2

ACQUISITION ITEM ATTRIBUTE TABLE ~200

| ITEM NUMBER | ITEM NAME | ACQUISITION SETTING | MONITORED OBJECT NUMBER | THRESHOLD VALUE | |
|---|---|---|---|---|---|
| 201 | 202 | 203 | 204 | 205 | |
| 100 | CPU USAGE RATE | TO BE ACQUIRED | 10 | 95+ | |
| 101 | MEMORY USAGE RATE | NOT TO BE ACQUIRED | 10 | 95+ | |
| 102 | DISK USAGE RATE | NOT TO BE ACQUIRED | 10 | 80+ | |
| 200 | NUMBER OF RECEIVED REQUESTS | TO BE ACQUIRED | 20 | 10000+ | ...② |
| 201 | NUMBER OF TRANSMITTED BYTES | NOT TO BE ACQUIRED | 20 | 100000+ | ...④ |
| 301 | JVM MEMORY USAGE RATE | TO BE ACQUIRED | 30 | 90+ | |
| 302 | NUMBER OF JSP REQUESTS | TO BE ACQUIRED | 30 | 100+ | |
| 401 | ROLLBACK RATE | NOT TO BE ACQUIRED | 40 | 20+ | |
| 402 | DB SPACE USAGE RATE | TO BE ACQUIRED | 40 | 70+ | |

ACQUISITION SETTING ITEM TABLE ~210

| ITEM NUMBER | MONITORED OBJECT NUMBER | SETTING ITEM NUMBER | SETTING MONITORED OBJECT NUMBER | |
|---|---|---|---|---|
| 211 | 212 | 213 | 214 | |
| 100 | 10 | 101 | 10 | |
| 100 | 10 | 102 | 10 | |
| 100 | 10 | 101 | 11 | |
| 100 | 10 | 102 | 11 | |
| 200 | 20 | 201 | 20 | ...③ |

FIG.3

OPERATION PERFORMANCE DATA TABLE ~300

| MONITORED OBJECT NUMBER (301) | ITEM NUMBER (302) | ACQUISITION TIME (303) | OPERATION PERFORMANCE VALUE (304) | |
|---|---|---|---|---|
| 10 | 100 | 2002.08.07 14:33:00 | 60 | |
| 10 | 101 | 2002.08.07 14:33:00 | 80 | |
| 20 | 200 | 2002.08.07 14:33:00 | 400 | |
| 10 | 100 | 2002.08.07 14:34:00 | 70 | |
| 10 | 101 | 2002.08.07 14:34:00 | 85 | |
| 20 | 200 | 2002.08.07 14:34:00 | 15000 | ...① |

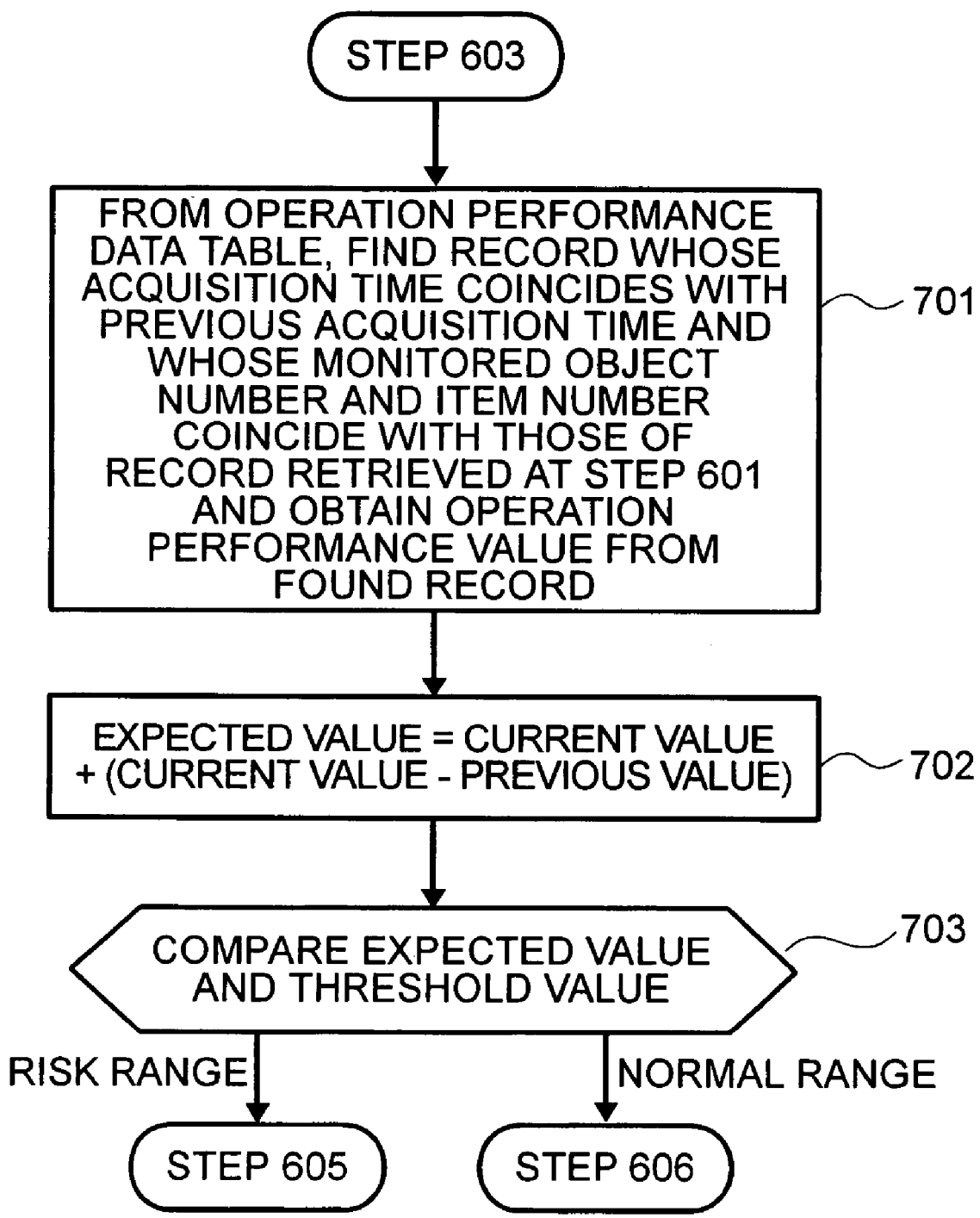

CONTROL SYSTEM COMPUTER, METHOD, AND PROGRAM FOR MONITORING THE OPERATIONAL STATE OF A SYSTEM

BACKGROUND OF THE INVENTION

The present invention relates to an operation control system for monitoring the operational state of a system. More particularly, the present invention relates to a technique for obtaining operation performance data from a monitored object in order to monitor the operational state of the system.

According to a prior art technique, an operation control system periodically obtains various type of operation performance data from monitored computers by use of a control computer to monitor the operational state of the network system. The obtained operation performance data is displayed on the display of the control computer and used by the manager to execute pattern analysis on the operational state of the network system and failure analysis.

To reduce the network load occurring when operation performance data is collected from a monitored object, Japanese Laid-Open Patent Publication No. 11-234274 discloses a technique for performing failure analysis by use of the monitored server.

However, the control system disclosed in the above Japanese Laid-Open Patent Publication does not change the number and the types of monitored items (e.g., CPU usage rate, memory usage rate, etc.) after it is determined that the operational state of the system has become risky based on the operation performance (metric) value of a specific monitored item.

On the other hand, the manager determines the degree of risk involved with the operational state of the system and the risk factors by checking the operation performance value of a specific monitored item whose operation performance value is within a risk range set based on a certain threshold value and the operation performance values of its related monitored items. Thus, the monitored items used to actually monitor the operational state of the system are limited to those whose operation performance value is within the risk range and their related monitored items.

The control system disclosed in the above Japanese Patent Laid-Open Publication obtains data of all predetermined, fixed monitored items, which increases both the capacity of the memory for storing the operation performance data and the use of the network (communication line) for transmitting/receiving the operation performance data and unduly reduces the processing performance of the CPU of the monitored computer, causing the problem of reduced processing performance for ordinary services.

SUMMARY OF THE INVENTION

It is, therefore, an object of the present invention to provide an operation control system which imposes a monitoring load to the extent necessary to carry out pattern analysis on the system operation and failure analysis and does not apply any excessive monitoring load.

To accomplish the above object, a control system according to an embodiment of the present invention includes a control computer, and a computer monitored by the control computer. The control computer includes an interface for receiving an operation performance metric value of each of a plurality of first monitored items from the monitored computer, and a control section for, based on the operation performance metric value of each first monitored item, determining a second monitored item whose data should be obtained and issuing an acquisition instruction instructing the monitored computer to obtain an operation performance metric value of the second monitored item which is associated with each first monitored item. The monitored computer includes an interface for receiving the acquisition instruction from the control computer, and a control section for, based on the acquisition instruction, obtaining the operation performance metric value of the second monitored item and transmitting it to the control computer.

The present invention also provides a method and computer program each of which includes steps corresponding to the functions of the control system described above.

BRIEF DESCRIPTION OF THE DRAWINGS

FIG. 2 is a diagram showing the data format of acquisition monitored item information;

FIG. 3 is a diagram showing the data format of operation performance data;

FIG. 7 is a flowchart showing acquisition monitored item setting processing based on an expected operation performance value.

DETAILED DESCRIPTION OF THE INVENTION

Figure 1:
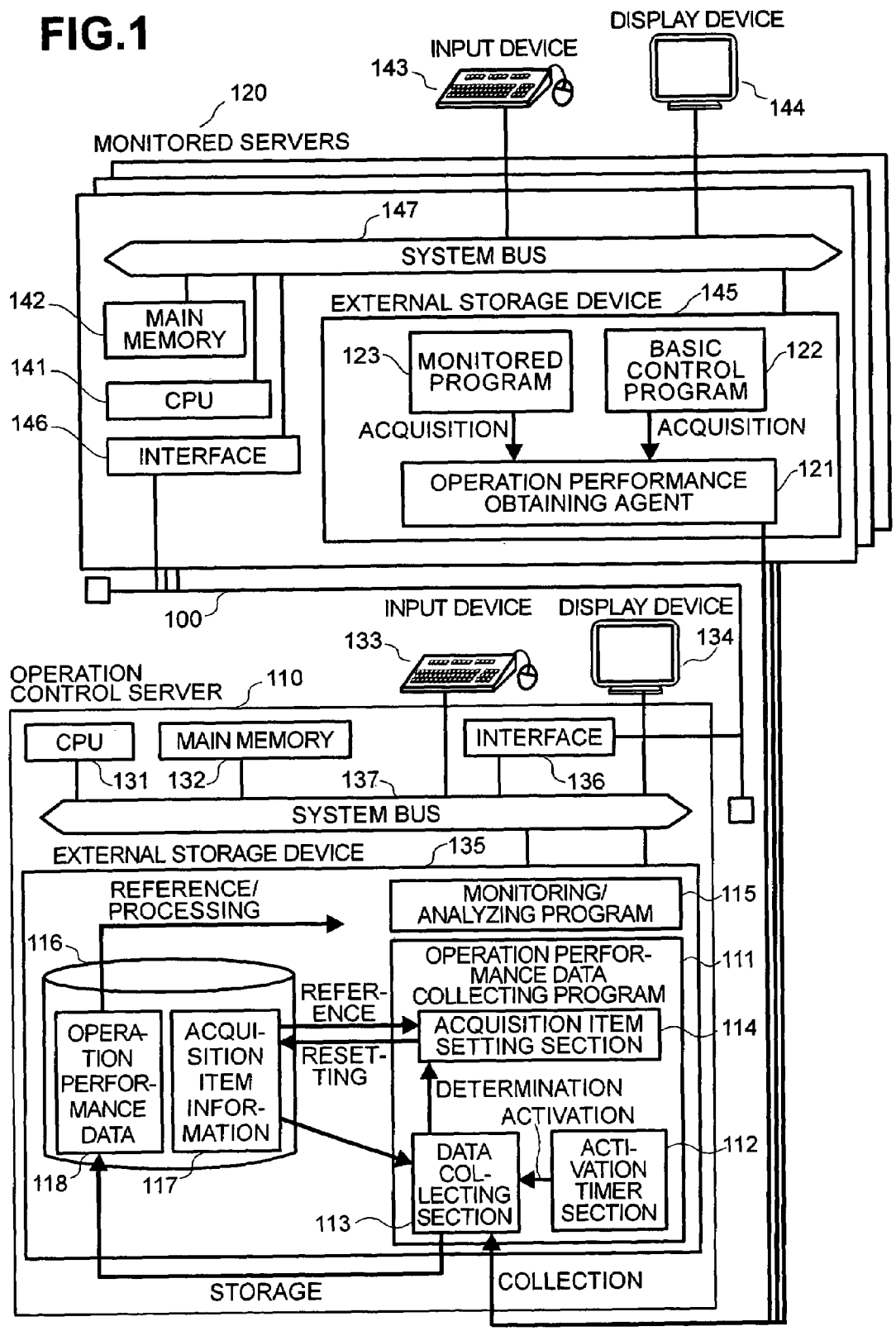
FIG. 1 is a diagram showing the configuration of a system according to an embodiment of the present invention.

FIG. 1 shows an overall configuration of a system according to the present invention. The system is made up of an operation control server 110 connected to a network 100, and a plurality of monitored servers 120. It should be noted that the network 100 is a communications line such as a local area network (LAN), WAN, or storage area network (SAN).

Each monitored server 120 is a monitored computer which includes components such as a CPU 141, a main memory 142, an input device 143, a display device 144, an external storage device 145, and an interface 146 connected to one another by way of a system bus 147. The monitored servers 120 may be host computers, application servers, database servers, or storage devices, for example.

The external storage device 145 stores a basic control program 122, a monitored program 123, and an operation performance obtaining agent 121 for obtaining operation performance information on the monitored server 120 from the basic control program 122 and operation performance information on the monitored program 123 from the monitored program 123 itself. They are read into the main memory 142 as necessary. The CPU 141 executes each program in the main memory 142. The input device 143 is a keyboard, a mouse, or the like, while the display device 144 is a bitmap display or the like. The interface 146 is used to connect with a network.

The operation control server 110 is a control computer which includes components such as a CPU 131, a main memory 132, an input device 133, a display device 134, an external storage device 135, and an interface 136 connected to one another by way of a system bus 137.

The external storage device 135 stores: an operation performance data collecting program 111 for collecting operation performance data from the operation performance obtaining agent 121 installed on each monitored server 120; a database 116 for storing the collected operation performance data; and a monitoring/analyzing program 115 for referring to and processing the stored operation performance data to indicate the operational state to the system manager. They are read into the main memory 132 as necessary. The CPU 131 executes each program in the main memory 132. The input device 133 is a keyboard, a mouse, or the like, while the display device 134 is a bitmap display or the like. The interface 136 is used to connect with a network.

The database 116 stores: acquisition monitored item information 117 which defines attribute information on each operation performance monitoring item obtained from all monitored servers 120; and operation performance data 118 collected by the operation performance data collecting program 111 at regular time intervals.

The operation performance data collecting program 111 implements the functions of such components as: a data collecting section 113 for collecting operation performance data from the operation performance obtaining agent 121 in each monitored server 120 based on the acquisition monitored items defined by the acquisition monitored item information 117 and storing it in the database 116; an acquisition monitored item setting section 114 for, when it is determined that an operation performance value collected by the data collecting section 113 is within a risk range set using a threshold value defined by the acquisition monitored item information 117 as a reference, setting the acquisition setting (that is, "To Be Acquired" or "Not To Be Acquired") of each related monitored item indicated by the acquisition monitored item information 117; and an activation (start) timer section 112 for activating the data collecting section 113 at regular time intervals.

FIG. 2 shows the data format of the acquisition monitored item information 117 according to the present embodiment.

The acquisition monitored item attribute table 200 holds the attributes for all monitored operation performance data.

Each entry in the acquisition monitored item attribute table 200 includes: a monitored item number 201 which is a unique number set for each monitored item by the system; a monitored item name 202; an acquisition setting 203 set for the operation performance data of each monitored item; a monitored object number 204 set for each monitored object from which the operation performance data of each monitored item is obtained (in FIG. 2, for example, 10 indicates a host computer, 20 a program, 30 an application server, and 40 a database server); and a threshold value 205 for indicating a reference value used to determine whether the operation performance value of each monitored item is within a risk range. It should be noted that according to the present embodiment, the monitored object number 204 is set on an apparatus basis for apparatuses such as host computers. However, the monitored object number 204 may be set on a hardware component basis or a software component basis (that is, for each program or each part of a program) within each apparatus. The threshold value 205 has attached thereto a sign indicating whether the range over or under the threshold value is the risk range. Specifically, if an acquired operation performance value is supposed to be in the risk range when it exceeds the threshold value, the plus sign "+" is assigned; otherwise the minus sign "−" is assigned instead. A plurality of threshold values 205 may be assigned to each item number 201. Further, the acquisition setting 203 may not indicate whether data of each item is "To Be Acquired" or "Not To Be Acquired". Instead, the acquisition setting 203 may provide information for changing, in steps, the number of pieces of operation performance data to be obtained per unit time (acquisition interval). With this arrangement, more operation performance data may be obtained in a riskier case.

The acquisition setting monitored item table 210 lists each specific monitored item and its related monitored items. The data of the related monitored items should be obtained when the operation performance value of the specific monitored item is in the risk range. It should be noted that the acquisition item setting section 114 may receive an input value from the input device 133, etc. and set or change the contents of the (acquisition setting) monitored item table 210 based on the input value.

Each entry in the acquisition setting monitored item table 210 includes: a monitored item number 211; a monitored object number 212 (indicating a monitored object) set for the monitored item indicated by the monitored item number 211; a setting monitored item number 213 for indicating a monitored item whose data should be obtained when (the operation performance value of) the monitored item indicated by the monitored item number 211 is in the risk range; and a setting monitored object number 214 (indicating a monitored object) set for the monitored item indicated by the setting monitored item number 213. Record ③ in FIG. 2, for example, indicates that if the threshold value of the monitored item "200" of the monitored object "20" changes, then the acquisition setting of the monitored item "201" of the monitored object "20" must be set again. It should be noted that a plurality of threshold values 205 may be employed each corresponding to a different risk range (degree of risk). With this arrangement, the setting monitored item number 213 and the setting monitored object number 214 for each monitored item number 211 may be changed for each risk range. Furthermore, priority may be given to each setting monitored item number 213 and each setting monitored object number 214. Then, as the degree of the risk increases, (the acquisition settings) for more setting monitored item numbers 213 and more setting monitored object numbers 214 may be set in the order of decreasing priority.

FIG. 3 shows the data format of the operation performance data 118 according to the present embodiment.

The operation performance data table 300 holds the operation performance values of monitored items collected from each monitored server 120.

Each entry in the operation performance data table 300 includes a monitored object number 301, a monitored item number 302, an acquisition time 303, and an operation performance value 304, collectively constituting collected operation performance data. It should be noted that the example shown in FIG. 3 obtains data at one minute intervals. However, a different interval may be employed for each item number 302.

Figure 4:
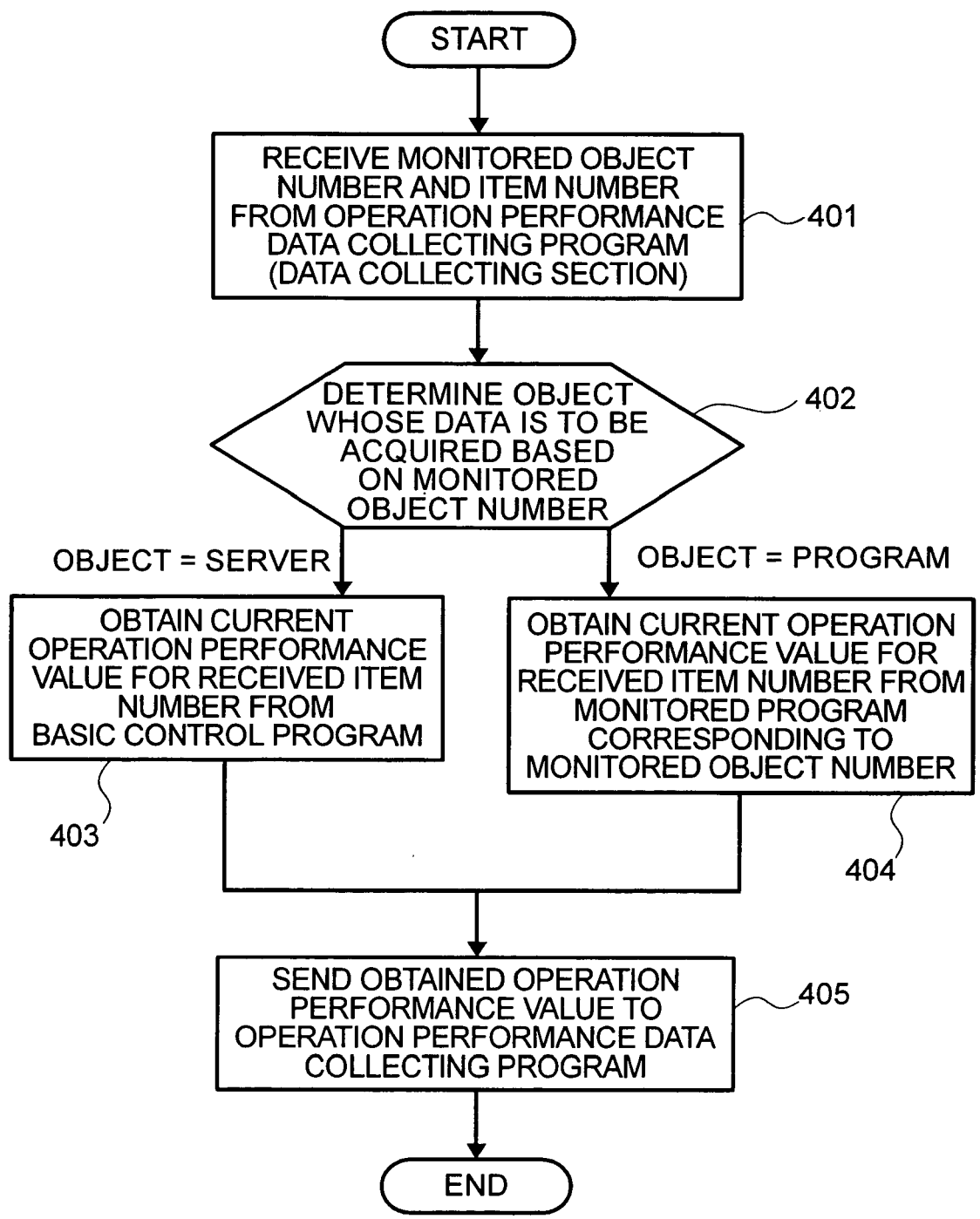
FIG. 4 is a flowchart showing operation performance acquisition processing.

FIG. 4 shows the flow of the processing carried out by the operation performance obtaining agent 121. It should be noted that the agent 121 is constantly activated as a demon program and returns the operation performance value of a desired monitored item requested by the data collecting section 113 of the operation control server 110 through the network 100.

At step 401, the agent 121 receives an operation performance data acquisition request specifying a monitored item from the operation performance data collecting program 111.

At step 402, the processing by the agent 121 proceeds to either step 403 or 404 depending on the contents of the received acquisition request.

If it is determined at step 402 that the acquisition request is for the operation performance data of a hardware component within the monitored server, the agent 121 instructs the basic control program 122 to obtain the operation performance data of the specified monitored item at step 403. Upon receiving this instruction, the basic control program 122 obtains the operation performance data of the specified monitored item.

If it is determined at step 402 that the acquisition request is for the operation performance data of a software program within the monitored server, on the other hand, the agent 121 instructs the monitored program 123 to obtain the operation performance data of the specified monitored item at step 404. Upon receiving this instruction, the monitored program 123 obtains the operation performance data of the specified monitored item.

At step 405, the agent 121 sends the operation performance data (received from the basic control program 122 or the monitored program 123) to the operation performance data collecting program 111 of the operation control server 110. It should be noted that after sending the operation performance data, the agent 121 assumes a wait state waiting for the next request.

Figure 5:
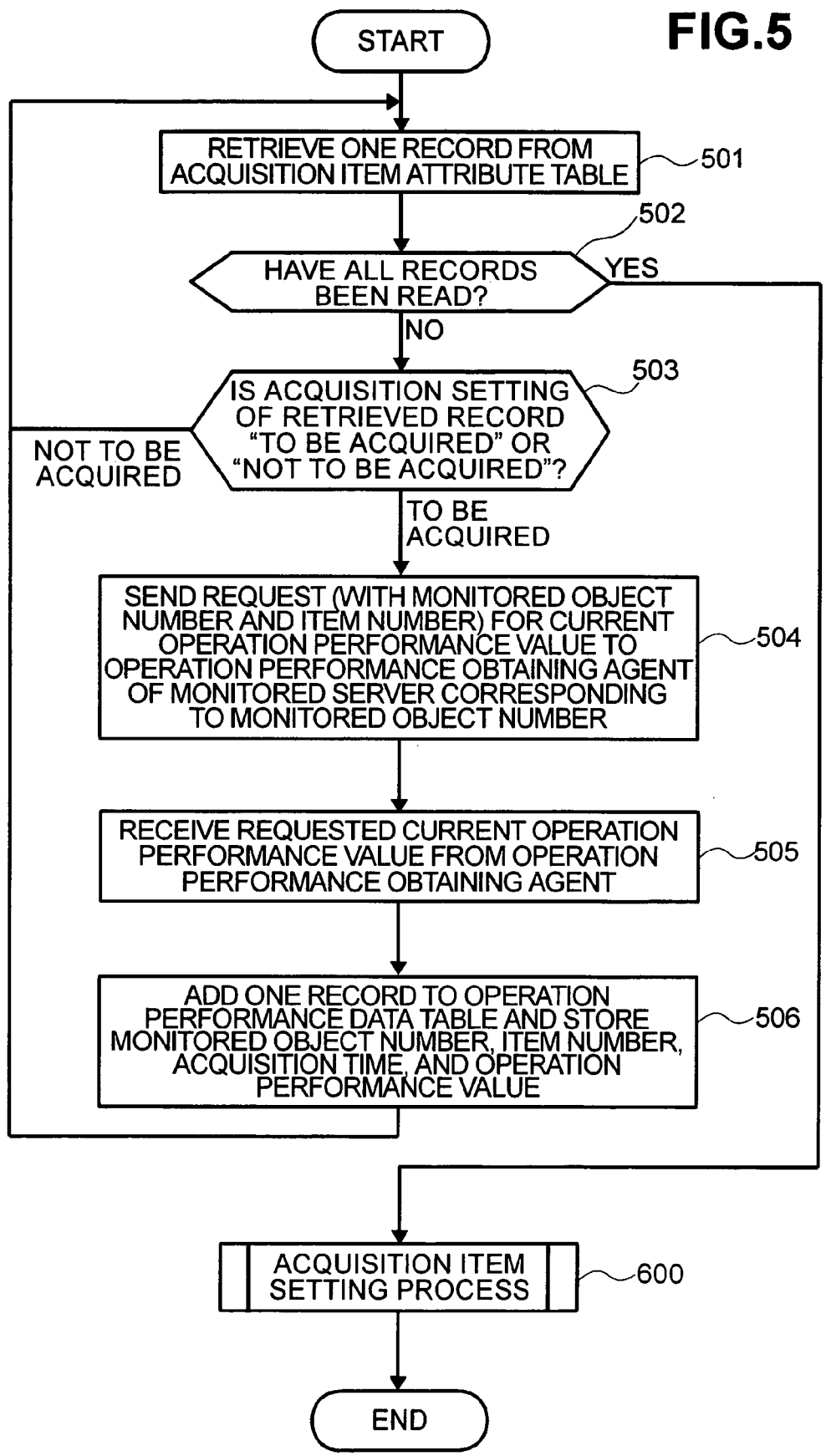
FIG. 5 is a flowchart showing data collection processing.

FIG. 5 shows the flow of the processing carried out by the data collecting section 113 of the operation performance data collecting program 111.

The collecting program 111 is activated by the activation (start) timer section 112 at regular time intervals (for example, one minute intervals), and collects the operation performance data of each monitored item whose acquisition setting 203 is set to "To Be Acquired" from each monitored server 120 based on the acquisition item attribute table 200 and stores the collected operation performance data in the database 116.

At step 501, the collecting program 111 reads a record (made up of items 201 and 202) from the acquisition monitored item attribute table 117.

At step 502, the processing by the collecting program 111 proceeds to either step 600 or 503 depending on whether or not all records have been already read.

At step 503, the collecting program 111 checks the acquisition setting of the read record.

If the acquisition setting of the record is "Not To Be Acquired" at step 503, the processing returns to step 501.

If the acquisition setting of the record is "To Be Acquired" at step 503, on the other hand, the collecting program 111 sends a request for operation performance data to the operation performance obtaining agent 121 of the monitored server(s) 120 corresponding to the monitored object number of the record through the network at step 504.

At step 505, the collecting program 111 obtains the requested operation performance data from the agent 121.

Based on the obtained operation performance data, the collecting program 111 stores a new record in the operation performance data table of the operation performance data 118 at step 506, the new record including the monitored object number 301, the monitored item number 302, the acquisition time 303, and the operation performance value 304. After the new record is stored, the processing returns to step 501.

Figure 6:
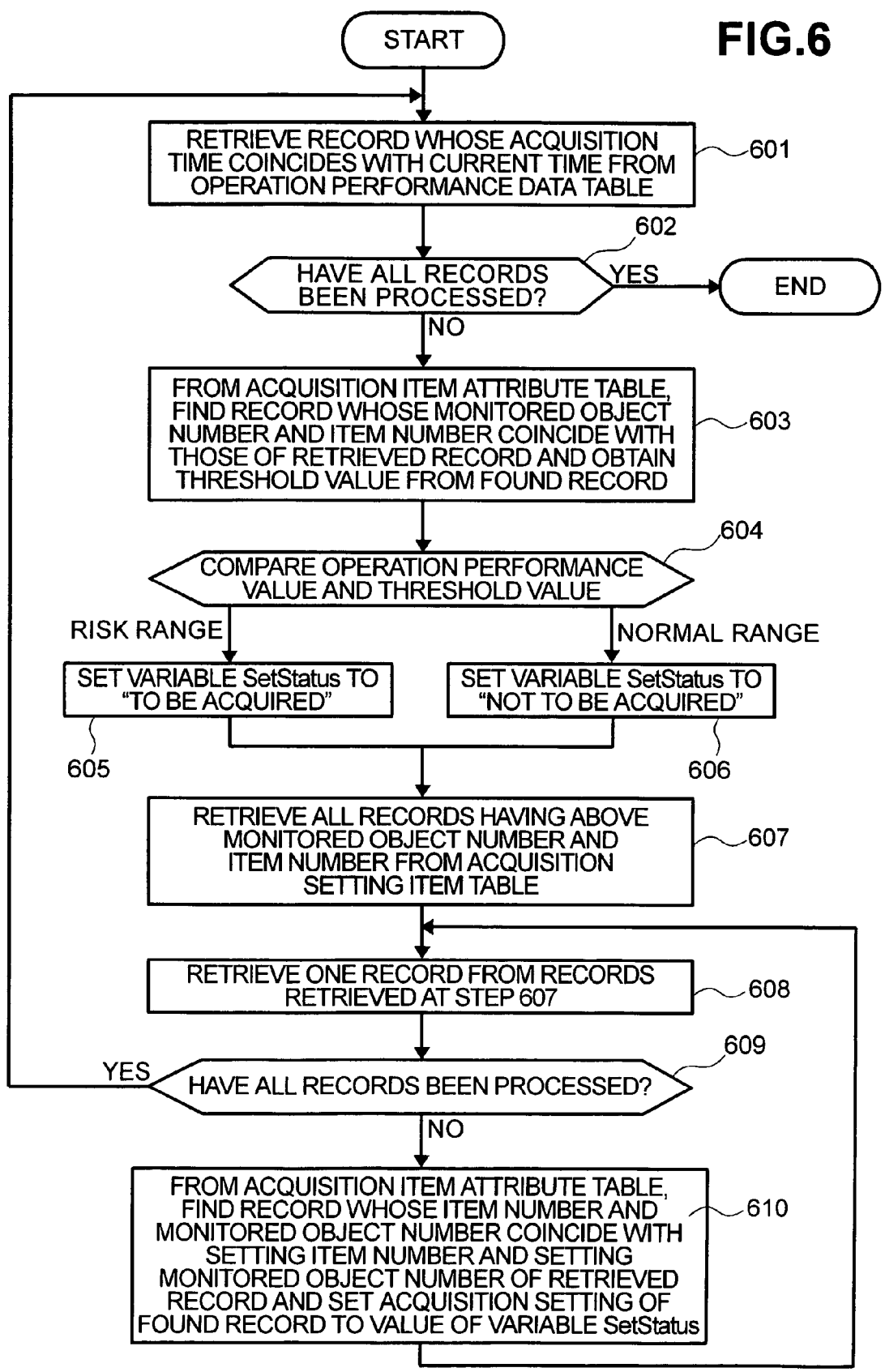
FIG. 6 is a flowchart showing acquisition monitored item setting processing.

If it is determined that all records have been already read at step 502, the acquisition monitored item setting process 600 shown in FIG. 6 is performed.

FIG. 6 shows the flow of the setting processing carried out by the acquisition monitored item setting section 114 of the operation performance data collecting program 111 according to the present embodiment.

The item setting section 114 is activated after the data collecting process shown in FIG. 5 is completed. The item setting section 114 sets the acquisition setting of each setting monitored item listed in the acquisition setting item table 210 by use of the acquisition item attribute table 200. (Specifically, if it is determined that the operation performance value of the monitored item indicated by a monitored item number 211 in the acquisition setting item table 210 is in the risk range, the item setting section 114 sets the acquisition setting of each setting monitored item for the monitored item to "To Be Acquired".

At step 601, the item setting section 114 reads one record made up of items 301 to 304, such as record ① in FIG. 3, whose acquisition time coincides with the current time from the operation performance data table of the operation performance data 118 stored in the database 116.

At step 602, it is determined whether all records have been processed. If it is determined that not all records have been processed, the processing by the item setting section 114 proceeds to step 603.

At step 603, the item setting section 114 retrieves from the acquisition monitored item attribute table a record (made up of items 201 and 202) whose item number 201 coincides with the item number 302 of the record read at step 601 (for example, record ① in FIG. 3→record ② in FIG. 2), and obtains the threshold value 205 of the retrieved record.

At step 604, the item setting section 114 compares the obtained (read) operation performance value 304 and the obtained threshold value 205. If the comparison result indicates that the operation performance value is in the risk range, the item setting section 114 sets the variable SetStatus to "To Be Acquired" at step 605. If the operation performance value is in the normal range, on the other hand, the item setting section 114 sets the variable SetStatus to "Not To Be Acquired" at step 606. It should be noted that the variable SetStatus is used to establish each acquisition setting 203 at step 610 and is temporarily stored in the main memory 132.

At step 607, the item setting section 114 retrieves from the acquisition setting monitored item table all records (each made up of items 211 to 214) whose item number 211 coincides with the monitored item number 302 of the record (for example, record ① in FIG. 3) retrieved at step 601.

At step 608, the item setting section 114 retrieves one record from the records retrieved at step 607 (for example, record ① in FIG. 3→record ③ in FIG. 2).

At step 609, the item setting section 114 determines whether the record retrieved at step 608 is an unprocessed record. If it is an unprocessed record, the processing by the item setting section 114 proceeds to step 610. If all the records retrieved at step 608 have been processed, on the other hand, the processing returns to step 601.

At step 610, the item setting section 114 finds from the acquisition monitored item attribute table a record whose monitored item number 201 coincides with the setting monitored item number 213 of the record (record ③ in FIG. 2) retrieved at step 608 (record ③ in FIG. 2→record ④ in FIG. 2), and sets the acquisition setting 203 of the found record to the value of the variable SetStatus set at step 605 or 606. After that, the processing returns to step 608. It should be noted that depending on the contents of the acquisition setting item table, the acquisition setting 203 for the same item number 201 may need to be set a plurality of times at step 610 during the process of processing all the records retrieved at step 601. In such a case, "To Be Acquired" is given priority for the acquisition setting 203 for the item number 201 over "Not To Be Acquired".

If it is determined at step 602 that all the records in the operation performance data table whose acquisition time coincides with the current time have been processed, the processing ends (at END).

FIG. 7 shows a variation of the flow of the setting processing carried out by the acquisition monitored item setting section 114 shown in FIG. 6, wherein expected operation performance data is introduced. It should be noted that since this example employs the same steps as those shown in FIG. 6 except for step 604, FIG. 7 shows only the different portion (steps). That is, after step 603, the processing proceeds through the steps shown in FIG. 7 before returning to step 605 or 606 in FIG. 6.

At step 701, the item setting section 114 finds from the operation performance data table a record whose acquisition time coincides with the previous acquisition time and whose item number 302 coincides with that of the record retrieved at step 601 and obtains the (previous) operation performance value 304 of the found record.

At step 702, the item setting section 114 calculates an expected operation performance value based on the current and previous operation performance values 304. It should be noted that according to the present embodiment, the current value minus the previous value is obtained and simply added to the current value to produce the expected value. However, any method for statistically calculating an expected value may be employed to produce the expected value.

At step 703, the item setting section 114 compares the calculated expected value and the threshold value obtained at step 603 to determine whether the expected value is in the risk range. If the item setting section 114 determines that the expected value is in the risk range, the processing proceeds to step 605. If the expected value is in the normal range, on the other hand, the processing proceeds to step 606.

According to the embodiment shown in FIG. 7 described above, the degree of risk of a system is determined based on an expected operation performance data value, making it possible to obtain, in advance, the operation performance data of monitored items necessary for analysis conducted when the value of the target monitored item is in the risk range.

It should be noted that according to the embodiment shown in FIG. 7 described above, an expected value is calculated based on the current and previous operation performance values. However, N number of past operation performance values may be used in a similar manner to calculate a more accurate expected value.

Further, when a Web system is set to be a monitored object, a periodic usage pattern is detected on a daily, weekly, or monthly basis or the like in most cases. In such a case, an expected value may be calculated based on values obtained at the same hour on the previous two days, for example. Thus, an expected value can be calculated based on the periodicity of the operation performance values.

Still further according to the present embodiment, the control server 110 side determines a monitored item whose data should be obtained based on its association with a monitored item whose operation performance value is in the risk range and instructs the monitored server 120 to obtain the operation performance data of the determined monitored item. However, the monitored server 120 side may determine a monitored item whose data should be obtained based on its association with a monitored item whose operation performance value is in the risk range, instead, and obtains the operation performance data of the determined item. This arrangement reduces the burden on the resources of the control server 110, such as the CPU, and on the network 100.

Thus, according to the embodiment of the present invention, when an obtained operation performance value is within a risk range, it is possible to increase the number of monitored items whose data is to be obtained for analysis, thereby intensively monitoring the closely related monitored items. Or alternatively, the number of monitored items whose data is to be obtained may be reduced to give priority to the primary service, resulting in less intensive monitoring operation. This arrangement makes it possible to collect operation performance data necessary and sufficient for monitoring analysis without imposing any unnecessary load on the monitored system.

The present invention can provide an operation control system which imposes a monitoring load to the extent necessary to carry out pattern analysis on the system operation and failure analysis and does not apply any excessive monitoring load.

What is claimed is:

1. A control system comprising:
   a control computer; and
   a computer monitored by said control computer;
   wherein said control computer includes:
   an interface for receiving an operation performance metric value of each of a plurality of first monitored items from said monitored computer, and
   a control section for, based on said operation performance metric value of said each first monitored item, determining a second monitored item and issuing an acquisition instruction instructing said monitored computer to obtain an operation performance metric value of said second monitored item, said second monitored item being associated with said each first monitored item; and
   wherein said monitored computer includes:
   an interface for receiving said acquisition instruction from said control computer, and
   a control section for, based on said acquisition instruction, obtaining said operation performance metric value of said second monitored item and transmitting it to said control computer,
   wherein when said operation performance metric value of said each first monitored item is within a risk range, the number of second monitored items is increased, thereby intensively monitoring closely related monitored items, and
   wherein when said operation performance metric value of said each first monitored item is outside of the risk range, the number of second monitored items is reduced, thereby not intensively monitoring closely related monitored items.

2. The control system as claimed in claim 1, wherein said control section of said control computer determines said second monitored item based on an expected value calculated by use of said operation performance metric value of said each first monitored item, said second monitored item being associated with said each first monitored item.

3. The control system as claimed in claim 2, wherein said expected value is calculated based on said operation performance metric value of said each first monitored item by assuming that acquisition of said expected value and that of said operation performance metric value of said each first monitored item fall on either a same hour, a same day of the week, a same date, or a same month, said operation performance metric value of said each first monitored item being previously obtained.

4. The control system as claimed in claim 1, wherein a plurality of said second monitored items are employed.

5. The control system as claimed in claim 4, wherein:
   priority is given to each of said second monitored items; and
   said control section of said control computer determines said second monitored item based on said priority.

6. The control system as claimed in claim 1, wherein said control section of said control computer determines a degree of risk of said control system based on said operation performance metric value of said each first monitored item and determines a second monitored item based on said degree of risk, said second monitored item being associated with said each first monitored item.

7. The control system as claimed in claim 1, wherein said control section of said control computer determines a degree of risk of said control system based on said operation performance metric value of said each first monitored item, determines a second monitored item and an acquisition interval based on said degree of risk, and issues an acquisition instruction instructing said monitored computer to obtain an operation performance metric value of said second monitored item at said determined acquisition intervals, said second monitored item being associated with said each first monitored item.

8. The control system as claimed in claim 1, wherein each monitored item includes information indicating the type of a performance characteristic of at least one of an application server, a database server, a storage device, and a program.

9. The control system as claimed in claim 1, wherein said performance characteristic includes information indicating at least one of a CPU usage rate, a memory usage rate, and a disk usage rate.

10. The control system as claimed in claim 1, wherein the second monitored items are different from the first monitored items.

11. The control system as claimed in claim 1, wherein a number of the second monitored items are increased from a number of the first monitored items.

12. The control system as claimed in claim 1, wherein a number of the second monitored items are decreased from a number of the first monitored items.

13. A control system comprising:
a control computer; and a computer monitored by said control computer;
wherein said monitored computer includes:
a control section for, based on an operation performance metric value of each of a plurality of first monitored items, determining a second monitored item and obtaining an operation performance metric value of said second monitored item, said second monitored item being associated with said each first monitored item, and
an interface for transmitting said obtained operation performance metric value; and
wherein said control computer includes:
an interface for receiving said operation performance metric value from said monitored computer, and
a control section for monitoring an operational state of a system based on said operation performance metric value,
wherein when said operation performance metric value of said each first monitored item is within a risk range, the number of second monitored items is increased, thereby intensively monitoring closely related monitored items, and
wherein when said operation performance metric value of said each first monitored item is outside of the risk range, the number of second monitored items is reduced, thereby not intensively monitoring closely related monitored items.

14. The control system as claimed in claim 13, wherein the second monitored items are different from the first monitored items.

15. The control system as claimed in claim 13, wherein a number of the second monitored items are increased from a number of the first monitored items.

16. The control system as claimed in claim 13, wherein a number of the second monitored items are decreased from a number of the first monitored items.

17. A control computer for monitoring an operational state of a system, comprising:
an interface for receiving an operation performance metric value of each of a plurality of first monitored items from a monitored computer; and
a control section for, based on said operation performance metric value of said each first monitored item, determining a second monitored item and instructing said monitored computer to obtain an operation performance metric value of said second monitored item, said second monitored item being associated with said each first monitored item,
wherein when said operation performance metric value of said each first monitored item is within a risk range, the number of second monitored items is increased, thereby intensively monitoring closely related monitored items, and
wherein when said operation performance metric value of said each first monitored item is outside of the risk range, the number of second monitored items is reduced, thereby not intensively monitoring closely related monitored items.

18. The control computer as claimed in claim 17, wherein a number of the second monitored items are increased from a number of the first monitored items.

19. The control computer as claimed in claim 17, wherein a number of the second monitored items are decreased from a number of the first monitored items.

20. The control computer as claimed in claim 17, wherein the second monitored items are different from the first monitored items.

21. A control method for monitoring an operational state of a system, comprising the steps of:
based on an operation performance metric value of each of a plurality of first monitored items received from a monitored computer object, determining a second monitored item, said second monitored item being associated with said each first monitored item;
instructing said monitored computer to obtain an operation performance metric value of said second monitored item; and
sending the obtained performance metric value to a monitoring computer, thereby permitting the operational state of the system to be monitored,
wherein when said operation performance metric value of said each first monitored item is within a risk range, the number of second monitored items is increased, thereby intensively monitoring closely related monitored items, and
wherein when said operation performance metric value of said each first monitored item is outside of the risk range, the number of second monitored items is reduced, thereby not intensively monitoring closely related monitored items.

22. The control computer as claimed in claim 21, wherein a number of the second monitored items are decreased from a number of the first monitored items.

23. The control method as claimed in claim 21, wherein a number of the second monitored items are increased from a number of the first monitored items.

24. The control method as claimed in claim 21, wherein the second monitored items are different from the first monitored items.

25. A control program, stored on a storage medium, for monitoring an operational state of a system, said control program, when executed, causes a computer to perform the steps of:
    based on an operation performance metric value of each of a plurality of first monitored items received from a monitored computer object, determining a second monitored item, said second monitored item being associated with said each first monitored item; and
    instructing said monitored computer to obtain an operation performance metric value of said second monitored item and to send the obtained performance metric value to a monitoring computer,
    wherein when said operation performance metric value of said each first monitored item is within a risk range, the number of second monitored items is increased, thereby intensively monitoring closely related monitored items, and
    wherein when said operation performance metric value of said each first monitored item is outside of the risk range, the number of second monitored items, thereby not intensively monitoring closely related monitored items.

26. The control program as claimed in claim 25, wherein a number of the second monitored items are decreased from a number of the first monitored items.

27. The control program as claimed in claim 25, wherein a number of the second monitored items are increased from a number of the first monitored items.

28. The control program as claimed in claim 25, wherein the second monitored items are different from the first monitored items.

* * * * *